Sept. 12, 1967  J. R. SCOGGINS  3,340,732
METEOROLOGICAL BALLOON
Filed Jan. 7, 1965  3 Sheets-Sheet 1

INVENTOR.
JAMES R. SCOGGINS
BY
ATTORNEYS

Sept. 12, 1967   J. R. SCOGGINS   3,340,732
METEOROLOGICAL BALLOON
Filed Jan. 7, 1965   3 Sheets-Sheet 3

INVENTOR.
JAMES R. SCOGGINS
ATTORNEYS

United States Patent Office

3,340,732
Patented Sept. 12, 1967

3,340,732
METEOROLOGICAL BALLOON
James R. Scoggins, Huntsville, Ala., assignor to the United States of America as represented by the Administrator of the National Aeronautics and Space Administration
Filed Jan. 7, 1965, Ser. No. 424,156
5 Claims. (Cl. 73—189)

ABSTRACT OF THE DISCLOSURE

A meteorological balloon having many small protuberances over its surface to provide aerodynamic stability.

---

This is a continuation-in-part of application Ser. No. 385,528, filed July 27, 1964.

The invention described herein may be manufactured and used by or for the Government of the United States of America for governmental purposes without the payment of any royalties thereon or therefor.

This invention relates to a fluid flow sensor and more particularly to a meteorological balloon which provides stable boundary layer separation of the air flow around the ballon as it ascends freely in the atmosphere thereby reducing the balloon's self-induced motions.

It has been known for many years that vertical gradients of the wind field in the atmosphere are many times larger than horizontal gradients. For example, wind shears over relatively small distances have been determined to be 50 or more times greater in the vertical than in the horizontal direction. For design and flight testing of vertically rising vehicles, particularly larger types such as rocket boosted space vehicles, it is important that the detailed characteristics of the wind field be specified in the vertical direction.

Wind sensors of a more or less spherical shape have been employed for many years. Winds are normally measured by tracking a spherically shaped helium or hydrogen-filled neoprene or rubber balloon which expands as it rises. Positions of the balloon in space are determined by tracking it either with radar or theodolites, and wind profile data are calculated from the balloon positions. Most of these data measured in this way are averaged over an altitude layer of 600 meters or more, and this averaging process eliminates some small-scale motions which would be indicated if the balloon were tracked precisely.

It has been proposed that a super pressure Mylar, constant volume sphere be used as a wind sensor and tracked by a precision radar such as the AN/FPS–16 to obtain the desired wind data. Acting on this proposal the National Aeronautics and Space Administration initiated a program of tracking such as a spherical balloon for the purposes of obtaining detailed profiles of the wind field above Cape Kennedy, Fla. Preliminary analyses were made and reported whereupon it was realized that the small scale features as indicated by the detailed profiles did not truly represent the atmospheric air motions. A program was then initiated to evaluate the aerodynamic properties of spheres. It was determined and corroborated by other independent tests that spherical balloons do not rise vertically in a calm atmosphere.

According to the present invention, it has been found that this difficulty may be overcome by roughening the surface of the sphere by uniformly dispersing a plurality of protuberances over its surface. Preferably the protuberances consist of a number of elements having the shape of a cone or a truncated cone with approximately the same height as the diameter of their bases and spaced on the order of two to three base diameters. These elements can be built into the balloon itself or they can be attached to the balloon's exterior.

Accordingly, it is an object of this invention to provide a meterological balloon having superior aerodynamic stability.

It is a further object of this invention to provide a meterological balloon having a plurality of protuberances uniformly distributed over its surface to provide roughness which results in an aerodynamically stable device.

It is yet another object of this invention to provide a roughened surface on a meterological balloon to produce a stable boundary layer separation of air flowing around the balloon as it rises freely in the atmosphere where there is a relatively high Reynolds number of the flow to enhance its areodynamic stability and response to horizontal wind components.

These and other objects and advantages of this invention, obvious to those skilled in the art, will be more apparent upon reference to the following detailed description of an embodiment thereof taken in conjunction with the attached drawings wherein.

In order to better understand the construction, use and principles effecting a body's behavior in the presence of a flowing fluid, the body will be described as a meteorological balloon. It is to be understood, however, that various other body shapes and uses may be found for this novel device in detecting the magnitude and direction of changes in the flow of fluids. In a large rocket booster recovery system, a balloon such as that described herein can be used as a drag device for reducing the vehicle's rate of descent. Other uses will be readily apparent to those skilled in the art.

Figure 1:
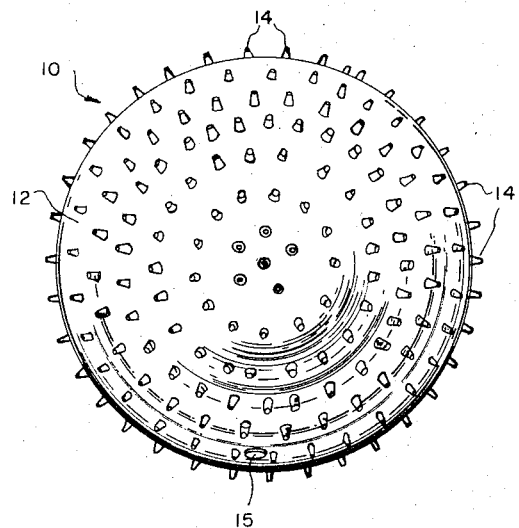
FIGURE 1 is a side elevational view of a meteorological ballon constructed in accordance with the invention showing the protuberances which provide aerodynamic stability.

With reference to the accompanying figures wherein like numerals represent like or similar parts throughout the several views and with initial attention directed to FIGURE 1, a meteorological balloon 10 is fabricated from a thin-wall, flexible material forming a gas-tight spherical envelope 12. Evenly dispersed on the surface of the envelope 12 are a plurality of protuberances 14 forming a "roughened surface" and a small mass 15.

Figure 2:
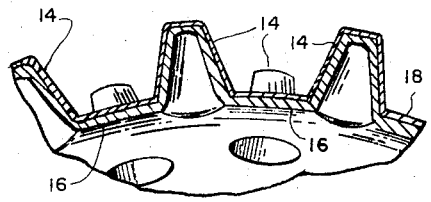
FIGURE 2 is a cross sectional view of a fragmentary portion of the balloon shown in FIGURE 1.

In FIGURE 2, the envelope 12 is shown as fabricated from laminated gores which are joined together by a conventional flexible adhesive. The laminated skin consists of a thin film base layer 16 of tough and non-expandable material. A preferred material for layer 16 is the polyester Mylar which is strong and well suited for applications such as this. The base layer 16 is covered with a thin metallic layer or film 18 of a material having a high ratio of strength to weight such as, for example, aluminum. The metallic coating 18 preferably forms the external surface of the balloon so as to provide protection for the base layer 16 and also to provide a superior reflective surface to facilitate detection by tracking instruments such as radar. It can be seen that the protuberances 14 are molded into the surface of the envelope 12 and extend outwardly from the interior of the balloon. While this is a preferred manner of providing the protuberances, it is obvious that they may also be cup-like elements secured to the exterior surface of the envelope 12 by an adhesive or by other suitable means.

The protuberances 14 shown in FIGURE 2 are truncated cones with their base diameter approximately equal to their height and they are spaced apart on the balloon surface approximately 2 to 3 diameters.

The envelope 12 is formed into a gas-tight enclosure having a valve (not shown) for filling the envelope; the valve acts also as a pressure relief valve to maintain an overpressure of from 4 to 8 millibars within the envelope. When it is desired to determine the wind profile above a particular location, the envelope 12 is filled with a suitable lighter-than-air gas such as, for example, helium. The balloon is then allowed to rise through the atmosphere and its position relative to a known reference point determined by means of a tracking radar. The various positions of the balloon are then plotted on graphs such as those shown in FIGURES 3 through 7 with the wind speed and direction determined in a conventional manner.

In order to understand the manner in which the protuberances 14 produce aerodynamic stability, a brief discussion of the flow around spheres will be presented. The basic pattern of such flow is well established and has been presented in many books on mechanical engineering and fluid dynamics.

In considering a sphere rising through the atmosphere in a horizontal wind field it is seen that the forces which act upon the sphere are buoyancy, gravity, drag and lift. The forces of buoyancy and gravity are easily evaluated and will not be considered in detail here. Drag and lift forces however, may be highly erratic, and therefore will be discussed in terms of their influence on the balloon's motions. For the purposes of this discussion it will be assumed that the winds are horizontal without vertical components.

The buoyant force is of course directed upward and produces an ascent rate for the balloon. A drag force due to the ascent of the balloon acts in a direction opposite to the buoyant force. Other drag forces due to irregular boundary layer flow and horizontal components of air flow over the balloon's surface are also present. The aerodynamic lift force, dependent upon the flow over the surface of the balloon, acts primarily perpendicularly to the drag force. Although the lift force is determined by the nature of the flow around the balloon it cannot always be readily evaluated. It may be quite large in some cases and have a significant influence on the balloon's motion.

Schlichting in a book entitled "Boundary Layer Theory," published by the McGraw-Hill Book Company, reported that Prandtl demonstrated that the nature of fluid flow around a sphere may be altered merely by placing a wire around the equator. The wire acts as a boundary layer transition trip for the air moving around the sphere and it reduces the laminar separation of the flow. Small surface irregularities on a balloon might be sufficient to induce laminar to turbulent boundary layer transition at different points around the sphere and, when this happens, the area of the flow separation will move either up-stream or down-stream on the surface of the sphere. The movement of the flow separation region will not necessarily be in the same direction at all points around the sphere. This condition will cause changes in lift and drag forces on the balloon, with the result that the balloon will experience accelerations. At any instant the flow separation could change, accelerating the balloon in a different direction. As the balloon is tracked, and it position plotted, these accelerations resulting from the self-induced motions of the sphere itself appear as winds which actually do not exist. Thus, an incorrect wind profile is presented. Surface roughness elements (protuberances) of the type illustrated herein cause a regular separation of the flow around the sphere and reduce the forces which produce the induced motions.

It was shown by Schlichting and others that the drag coefficient is a function of the Reynolds number for the particular flow. For a sphere at high Reynolds numbers, the drag coefficient is small. As the Reynolds number decreases the drag coefficient goes through a sharp increase in value and reaches a rather large value at small Reynolds numbers. The nature of the flow separation process is quite different at low Reynolds numbers than at high Reynolds numbers. Characteristics of this flow separation process influence the nature of the drag and lift forces and, therefore, the induced motions of the meteorological balloon. As high Reynolds numbers the separation area has moved down-stream and is near the back or trailing portion of the sphere. Small surface irregularities on the sphere may alter the nature of the boundary layer and separation characteristics, thus producing variations in the magnitude and direction of the lift and drag forces. At small Reynolds numbers, flow separation takes place further up stream on the sphere and results in a smaller variation in these forces which cause induced motions. Therefore at small Reynolds numbers the spherical balloon is more stable, and it gives a better indication of the true wind conditions.

A spherical meteorological balloon can be made to operate at low Reynolds numbers by either decreasing its size or decreasing its ascent rate. For small balloons the ascent rate is inherently low and, therefore, the Reynolds number of the flow over the balloon surface is low. Additionally the ascent rate of a balloon may be decreased by artificially increasing the mass of the balloon for a given diameter and specific gravity. However, with either a small balloon or a larger constant volume balloon with increased mass, only a limited altitude can be reached. The approach of the present invention is to artificially change the air flow over the balloon surface such that a lower Reynolds number flow is simulated. By the use of the protuberances 14 a roughened surface is created on the balloon which induces a larger wake behind the balloon as it ascends therefore producing larger drag and smaller lift forces at the high Reynolds number flow.

Figure 3:
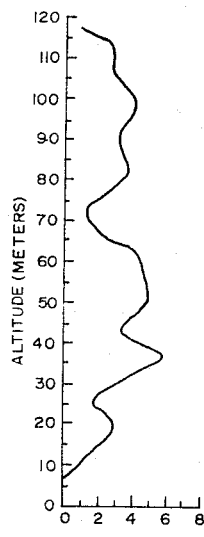
FIGURE 3 is a graph showing wind speed plotted against altitude taken from data obtained by tracking a spherical balloon.
Figure 4:
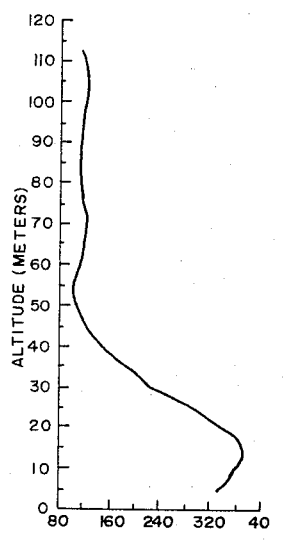
FIGURE 4 is a graph in which wind direction is plotted against altitude obtained by tracking a spherical balloon.
Figures 5, 6:
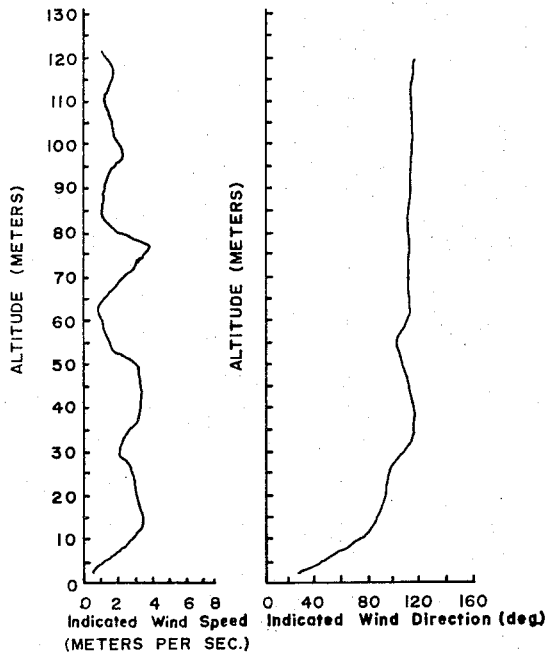
FIGURE 5 is a graph similar to that shown in FIGURE 3 but utilizing data obtained by tracking a meteorological balloon having a roughened surface in accordance with the instant invention.
FIGURE 6 is a graph similar to that illustrated in FIGURE 4 but utilizing data obtained from tracking a meteorological balloon having a roughened surface in accordance with the instant invention.

Comparative results obtained in tracking a balloon having a smooth surface and those obtained in tracking a balloon having a roughened surface in accordance with this invention are shown in FIGURES 3 through 6. A comparison of FIGURES 3 and 5 shows that the oscillations indicated by the sphere having a roughened surface in accordance with the invention are approximately half those indicated by a smooth surface balloon. The comparison of FIGURES 4 and 6 shows that a reversal of wind direction was indicated when a smooth surface spherical balloon was utilized which was not indicated by tracking data obtained from the roughened surface balloon and which did not actually occur.

Figure 7:
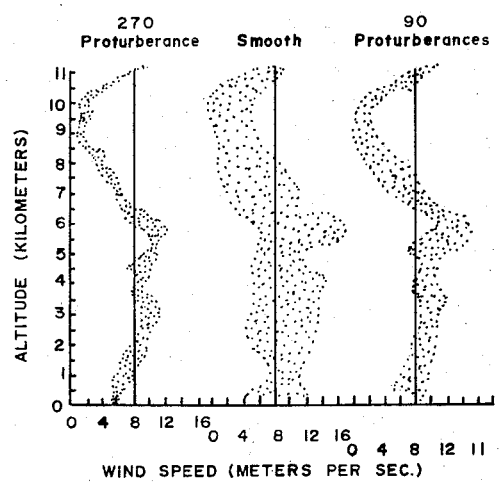
FIGURE 7 is a graph in which the wind speed is plotted against the altitude illustrating the successive increases in accuracy obtained utilizing meteorlogical ballons having a smooth spherical surface, one having 90 protuberances and one having 270 protuberances.

A series of balloon flights has been made at Cape Kennedy with tracking data obtained from an AN/FPS-16 radar. The data obtained from these flights are shown in the graphs of FIGURE 7. Included in these runs were rough surface spheres, one having 270 protuberances distributed over its surface and one having 90 protuberances distributed over its surface, and also a sphere having a smooth surface. These profiles showed dramatically the influence of the surface roughness on the response characteristics of the sphere to changing wind conditions. A comparison of the profiles indicated that the surface roughness decreases the dispersion of the test data about a mean profile. This is due to the fact that the surface roughness stabilizes the boundary layer separation points and therefore the drag forces and reduces the influence of the corresponding lift forces.

While it is obvious that many dispersion patterns and sizes and shapes of the protuberances may be utilized, the following described meteorological balloon was found to produce outstanding results. The envelope itself is constructed on one-half mil aluminized Mylar formed into a sphere of diameter between one and two meters with an accuracy in the spherical shape of 1 to 2 percent. The protuberant surface roughness elements have the shape of truncated cones and are approximately 7 centimeters in diameter at their base and approximately 8 centimeters in height. The roughness elements are spaced apart approximately 15 to 20 centimeters.

Figure 8:
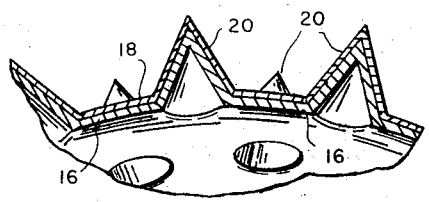
FIGURE 8 is a cross sectional view of the fragmentary portion of a balloon having conical protuberances.
Figure 9:
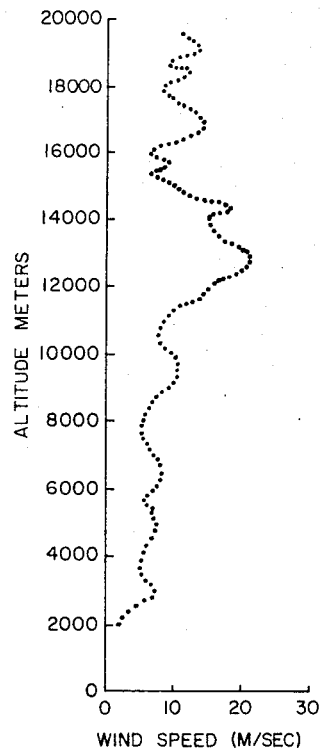
FIGURE 9 is a graph showing wind speed plotted against altitude taken from data obtained by tracking a spherical balloon at higher altitudes.
Figure 10:
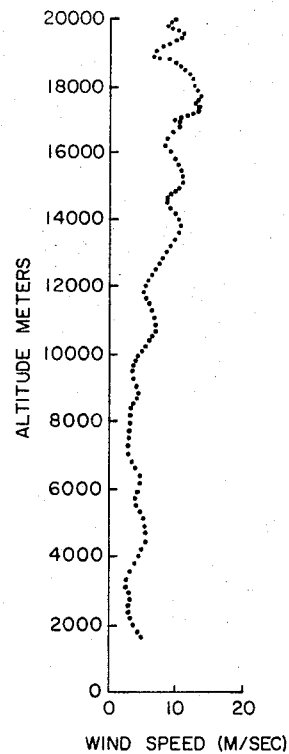
FIGURE 10 is a graph showing wind speed plotted against altitude taken from data obtained by tracking a spherical balloon with a plurality of conical protuberances at higher altitudes.
Figure 11:
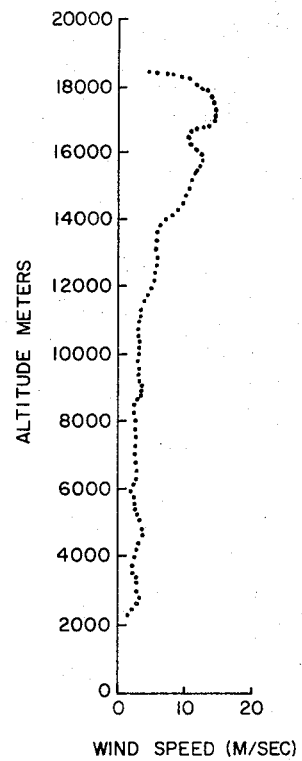
FIGURE 11 is a graph showing wind speed plotted against altitude taken from data obtained on another occasion by tracking a spherical balloon with conical protuberances at higher altitudes.

It was found that wind profile information may be obtained at higher altitudes using the configuration shown in FIGURE 2; however, dramatic increases in the response of the meteorological balloon of this invention to the true winds at these altitudes may be obtained by using conical protuberances 20 shown in FIGURE 8. A plot of wind speed against altitude from data obtained from tracking a spherical balloon with truncated protuberances at higher altitudes is shown in FIGURE 9 while FIGURES 10 and 11 portray the same information obtained from tracking a balloon having conical protuberances. Also it was found that the small mass 15 kept the balloon from tumbling as it ascended thus reducing induced motions from this source. The size of the mass (which may be of lead or other suitable material attached to the balloon by conventional means) is determined such that it balances the shearing forces created as the balloon tends to tumble while it is less than that which would produce a pendulum effect on the freely rising balloon.

It will be apparent that by utilizing the teachings of this invention a meteorological balloon having superior response characteristics and greater accuracy in measuring wind velocity and direction may be produced. It is a vast improvement over the old, smooth surface spherical type meteorological balloons which were subject to self-induced directional changes giving a false picture of the wind profile above a particular location. Data obtained from measurements made utilizing the old type balloon had to be averaged over an altitude layer of 600 meters or more which eliminated small-scale motions. Such a requirement precluded the taking of measurements at close intervals so that small scale wind changes could not be determined. The instant invention resolves this problem in the manner described so that the measurements may be taken at increments of 25 meters at lower altitudes. This is an invaluable tool in these days when wind profile information must be known precisely to determine the structural loads and control responses of large rocket propelled boosters and other vehicles during launch and recovery operations. Additionally it is an invaluable tool in determining the wind profile at higher altitudes since the induced motions which exist using the old type spherical balloons were increased in the higher altitudes due to increased values of the Reynolds number of the flow over the surface of the balloon.

It is of course understood that with the teachings here, different shapes of the body used to indicate changes in the direction and velocity of a fluid flowing around the body are possible; however, the spherical balloon described herein is an economical and reliable device useful in the determination of changes in the atmospheric air flow at different altitudes. Also the mass 15 placed on the surface of the meteorological balloon described herein may lead to the result that the protuberances need not be placed over the entire exterior surface of the balloon. Possibly only a strip of protuberances around the balloon would be needed in the area of the flow separation.

There has been described the invention in its novel aspects; however, it is to be understood that there has been shown merely embodiments of the invention and that the invention is not to be limited to the structure shown and described. The present embodiments are therefore to be considered in all respects illustrative and not restrictive. Obviously numerous modifications and variations of the present invention within the invention's true spirit are possible in light of the above teachings. It is therefore to be understood that within the scope of the appended claims the invention may be practiced otherwise than as specifically described herein.

What is claimed is:

1. A meteorological balloon for use in the measurement of the magnitude and direction of a wind field above a geographical location, comprising:
    (a) a hollow, spherical envelope fabricated from a thin laminate comprising a plastic film and a metallic film, said envelope having a diameter in the range of one to two meters;
    (b) said envelope having many small, integral, hollow, exterior protuberances molded into the surface of the envelope, each protuberance having a height to base ratio slightly greater than one and being spaced apart from its adjacent protuberances at a distance of about two to three base widths so as to cause a uniform and stable separation of the boundary layer of air which flows around said envelope during the measurement of the wind field.

2. A meteorological balloon as defined by claim 1 wherein said protuberances are truncated cones.

3. A meteorological balloon as defined by claim 1 wherein said protuberances are of a conical shape.

4. In a spherical meteorological balloon of the substantially constant volume type having a diameter in the range of 1 to 2 meters, the improvement comprising:
    (a) many relatively small truncated cone shaped protuberances uniformly distributed on its exterior surface;
    (b) said protuberances having a height to base ratio slightly greater than one and being spaced apart at a distance of two to three base diameters.

5. In a spherical meteorological balloon of the substantially constant volume type having a diameter in the range of 1 to 2 meters, the improvement comprising:
    (a) many relatively small cone shaped protuberances uniformly distributed on its exterior surface;
    (b) said protuberances having a height to base ratio slightly greater than one and being spaced apart at a distance of two to three base diameters.

(References on following page)

References Cited

UNITED STATES PATENTS

| | | | |
|---|---|---|---|
| 496,854 | 5/1893 | Capozza | 244—32 |
| 2,492,800 | 12/1949 | Isom | 244—31 |
| 2,996,212 | 8/1961 | O'Sullivan | 73—170 |
| 3,141,636 | 7/1964 | Merrill | 244—31 |

FOREIGN PATENTS 112,507  12/1925  Switzerland.

JAMES J. GILL, *Acting Primary Examiner.*

J. MYRACLE, *Assistant Examiner.*